United States Patent
Jensen et al.

(10) Patent No.: US 9,548,562 B1
(45) Date of Patent: Jan. 17, 2017

(54) MID-PLANE CONNECTOR CONFIGURATION

(71) Applicant: LENOVO Enterprise Solutions (Singapore) PTE. LTD., New Tech Park (SG)

(72) Inventors: David J. Jensen, Raleigh, NC (US); William G. Holland, Cary, NC (US); Brian Kerrigan, Cary, NC (US); Robert M. Lindsay, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/861,945

(22) Filed: Sep. 22, 2015

(51) Int. Cl.
*H01R 13/629* (2006.01)
*H01R 25/00* (2006.01)

(52) U.S. Cl.
CPC ............ *H01R 13/629* (2013.01); *H01R 25/00* (2013.01)

(58) Field of Classification Search
CPC .............. H01R 13/629; H01R 23/7005; H01R 12/7005; H01R 9/24; H01R 25/00
USPC .......................... 439/378, 680, 681, 679, 374
See application file for complete search history.

(56) References Cited

U.S. PATENT DOCUMENTS

| | | | | |
|---|---|---|---|---|
| 3,491,330 A | * | 1/1970 | Barnhart ............ | H01R 13/6453 439/681 |
| 3,771,109 A | * | 11/1973 | Bruckner ............ | H05K 7/1069 439/331 |
| 4,568,134 A | * | 2/1986 | DiMondi ........... | H01R 12/7005 439/64 |
| 5,032,088 A | * | 7/1991 | Kuramitsu .......... | H05K 7/1084 439/378 |
| 5,173,063 A | * | 12/1992 | Barkus ............... | H01R 13/6453 439/633 |
| 5,318,463 A | * | 6/1994 | Broschard, III ... | H01R 13/6453 439/541.5 |
| 5,391,091 A | * | 2/1995 | Nations .............. | H01R 12/7047 439/359 |
| 5,466,171 A | * | 11/1995 | Bixler .................... | H01R 13/64 439/378 |
| 5,885,088 A | * | 3/1999 | Brennan ................ | H01R 13/64 439/378 |
| 5,919,063 A | * | 7/1999 | Wang .................. | H01R 23/6873 439/108 |
| 6,069,992 A | * | 5/2000 | Hyzin .................. | G02B 6/3885 385/55 |
| 6,565,390 B2 | * | 5/2003 | Wu ..................... | H01R 12/7005 439/378 |

(Continued)

*Primary Examiner* — Abdullah Riyami
*Assistant Examiner* — Harshad Patel
(74) *Attorney, Agent, or Firm* — Kunzler Law Group

(57) ABSTRACT

An apparatus with a specific connector configuration is disclosed. A system that includes the connector configuration of the apparatus is also disclosed. The apparatus includes a first connector having a first guide pin insertable into a first guide socket of a first mating connector. The first guide pin is blocked from being inserted into a second guide socket of a second mating connector. The second guide socket has a different shape than the first guide socket. The apparatus includes a second connector having a second guide pin with a different shape than the first guide pin. The second guide pin is insertable into the first guide socket of the first mating connector and insertable into the second guide socket of the second mating connector.

18 Claims, 6 Drawing Sheets

(56) References Cited

U.S. PATENT DOCUMENTS

| | | | | |
|---|---|---|---|---|
| 6,832,929 | B2* | 12/2004 | Garrett | G11B 33/122 |
| | | | | 439/378 |
| 6,908,330 | B2* | 6/2005 | Garrett | H01R 13/518 |
| | | | | 439/378 |
| 6,945,810 | B1* | 9/2005 | Morana | H01R 12/7005 |
| | | | | 439/378 |
| 7,326,092 | B2* | 2/2008 | Fedder | H01R 12/7005 |
| | | | | 361/756 |
| 9,282,669 | B2* | 3/2016 | Yan | H05K 7/14 |
| 9,312,628 | B2* | 4/2016 | Lappoehn | H01R 12/707 |
| | | | | 439/570 |

\* cited by examiner

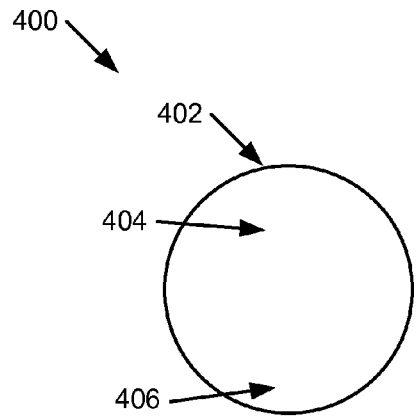
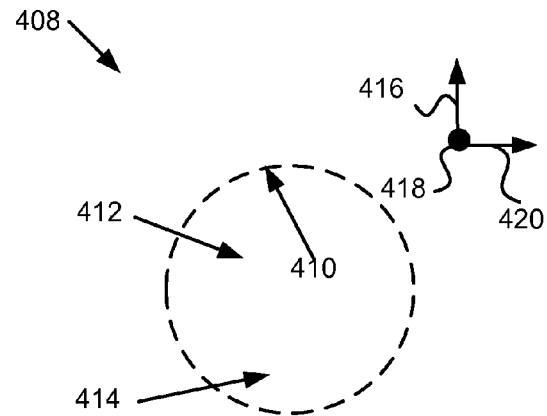
FIGURE 4A          FIGURE 4B
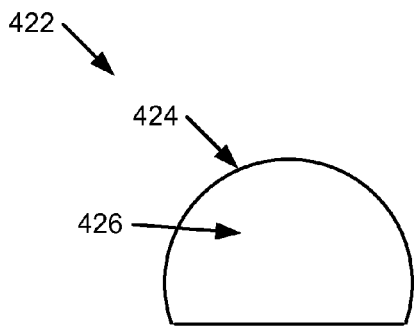
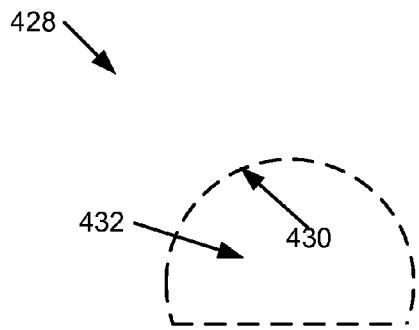
FIGURE 4C          FIGURE 4D

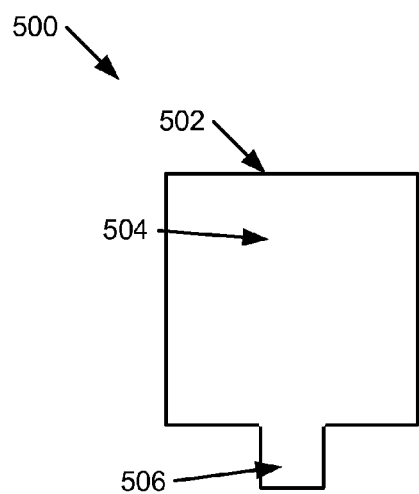
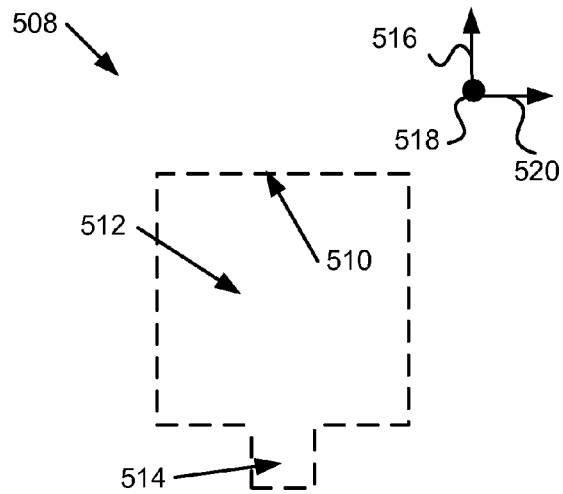
FIGURE 5A          FIGURE 5B
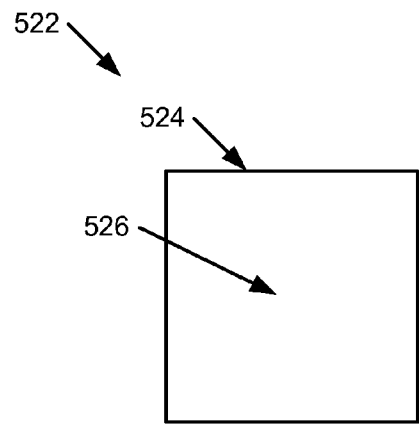
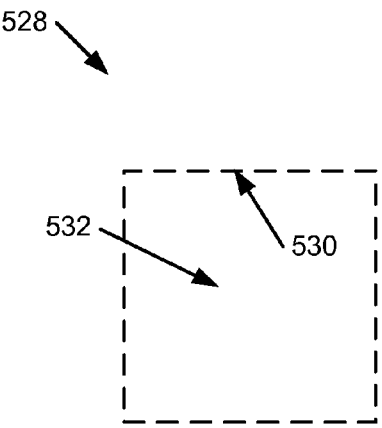
FIGURE 5C          FIGURE 5D

MID-PLANE CONNECTOR CONFIGURATION

FIELD

The subject matter disclosed herein relates to connectors and more particularly relates to a mid-plane connector configuration.

BACKGROUND

DESCRIPTION OF THE RELATED ART

Information handling devices, such as desktop computers, laptop computers, tablet computers, etc., may include mid-plane connectors. The mid-plane connectors typically mate with a mating connector on a mezzanine card. Certain mid-plane connectors may be configured to mate with specific mezzanine cards.

BRIEF SUMMARY

An apparatus with a specific connector configuration is disclosed. A system that includes the connector configuration of the apparatus is also disclosed. The apparatus includes a first connector having a first guide pin insertable into a first guide socket of a first mating connector. The first guide pin is blocked from being inserted into a second guide socket of a second mating connector. The second guide socket has a different shape than the first guide socket. The apparatus includes a second connector having a second guide pin with a different shape than the first guide pin. The second guide pin is insertable into the first guide socket of the first mating connector and insertable into the second guide socket of the second mating connector.

In one embodiment of the apparatus, an internal surface shape of the first guide socket includes an internal shape of the second guide socket plus an internal shape of an additional volume. In another embodiment of the apparatus, the first guide pin includes a guiding portion that guides connection of the first connector with the first mating connector and the second guide pin includes a guiding portion that guides connection of the second connector with either of the first mating connector and the second mating connector. In certain embodiments, a shape of an outer surface of the first guide pin substantially conforms to a shape of an inner surface of the first guide socket, and a shape of an outer surface of the second guide pin includes a shape that is common with a portion of the first guide pin and that conforms to a portion of the shape of the inner surface of the first guide socket. In such embodiments, the portion of the shape of the inner surface of the first guide socket that conforms to the first guide pin is shaped to maintain the second guide pin in position as the second guide pin is inserted into the first guide socket substantially without movement in a direction perpendicular to the direction of insertion of the second guide pin.

In some embodiments, an outer surface of a cross section of the second guide pin substantially conforms to a shape of a cross section of an inner surface of the second guide socket and an outer surface of a cross section of each of the first and second guide pins share a portion with a common shape and the outer surface of the cross section of the first guide pin includes an additional portion missing from the outer surface of the cross section of the second guide pin. In certain embodiments, an inner surface of a cross section of each of the first and second guide sockets share a portion with a common shape and the inner surface of the cross section of the first guide socket includes an additional portion missing from the inner surface of the cross section of the second guide socket.

In one embodiment, the second guide pin is stepped to include a first section having a first shape and a second section having second shape. In such an embodiment, a cross section of the first shape includes only a portion of a cross section of the second shape. Moreover, in such an embodiment, the first section is disposed on an end of the second guide pin first inserted into a guide socket. In certain embodiments, a cross section of the first guide pin substantially matches the cross section of the second shape, and the cross section of the first guide pin is uniform along a body length of the first guide pin. In another embodiment, the second guide socket is stepped to match the first and second sections of the second guide pin.

In one embodiment, the first guide pin has a circular cross section. In such an embodiment, the circular cross section may be substantially constant along a length of the first guide pin. In some embodiments, the second guide pin has a D-shaped cross section. In such embodiments, the D-shaped cross section includes at least half of a circle. In some embodiments, the D-shaped cross section is greater than half of a circle. In certain embodiments, the apparatus has a mid-plane that includes the first and second connectors. In one embodiment, the first and second connectors are mezzanine connectors.

Another apparatus includes a first connector having a first guide socket that receives a first guide pin of a first mating connector and blocks a second guide pin of a second mating connector. The second guide pin has a different shape than the first guide pin. The apparatus includes a second guide socket having a different shape than the first guide socket. The second guide socket is able to receive the first guide pin of the first mating connector and the second guide pin of the second mating connector.

One system that includes the connector configuration of the apparatus includes a first connector. The system also includes a first mating connector. In the system, one of the first connector and the first mating connector includes a first guide pin, and another of the first connector and the first mating connector includes a first guide socket. The first guide pin is insertable into the first guide socket and blocked from being inserted into a second guide socket. The second guide socket has a different shape than the first guide socket. The system includes a second connector and a second mating connector. In the system, one of the second connector and the second mating connector includes a second guide pin, and another of the second connector and the second mating connector includes the second guide socket. The second guide pin has a different shape than the first guide pin. The second guide pin is insertable into the first and second guide sockets. In one embodiment, the first connector is a connector of a standard input/output ("I/O") mezzanine card and the second connector is a connector of a storage mezzanine card.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A is a diagram illustrating one embodiment of a cross section of a first guide pin in accordance with one embodiment of the present invention.

FIG. 4B is a diagram illustrating one embodiment of a cross section of a first guide socket in accordance with one embodiment of the present invention.

FIG. 4C is a diagram illustrating one embodiment of a cross section of a second guide pin in accordance with one embodiment of the present invention.

FIG. 4D is a diagram illustrating one embodiment of a cross section of a second guide socket in accordance with one embodiment of the present invention.

FIG. 5A is a diagram illustrating another embodiment of a cross section of a first guide pin in accordance with one embodiment of the present invention.

FIG. 5B is a diagram illustrating another embodiment of a cross section of a first guide socket in accordance with one embodiment of the present invention.

FIG. 5C is a diagram illustrating another embodiment of a cross section of a second guide pin in accordance with one embodiment of the present invention.

FIG. 5D is a diagram illustrating another embodiment of a cross section of a second guide socket in accordance with one embodiment of the present invention.

DETAILED DESCRIPTION

As will be appreciated by one skilled in the art, aspects of the embodiments may be embodied as a system, method, or apparatus. Moreover, reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. The schematic flowchart diagrams and/or schematic block diagrams in the Figures illustrate the architecture, functionality, and operation of possible implementations of apparatuses, systems, and methods.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment.

The description of elements in each figure may refer to elements of proceeding figures. Like numbers refer to like elements in all figures, including alternate embodiments of like elements.

Figure 1:
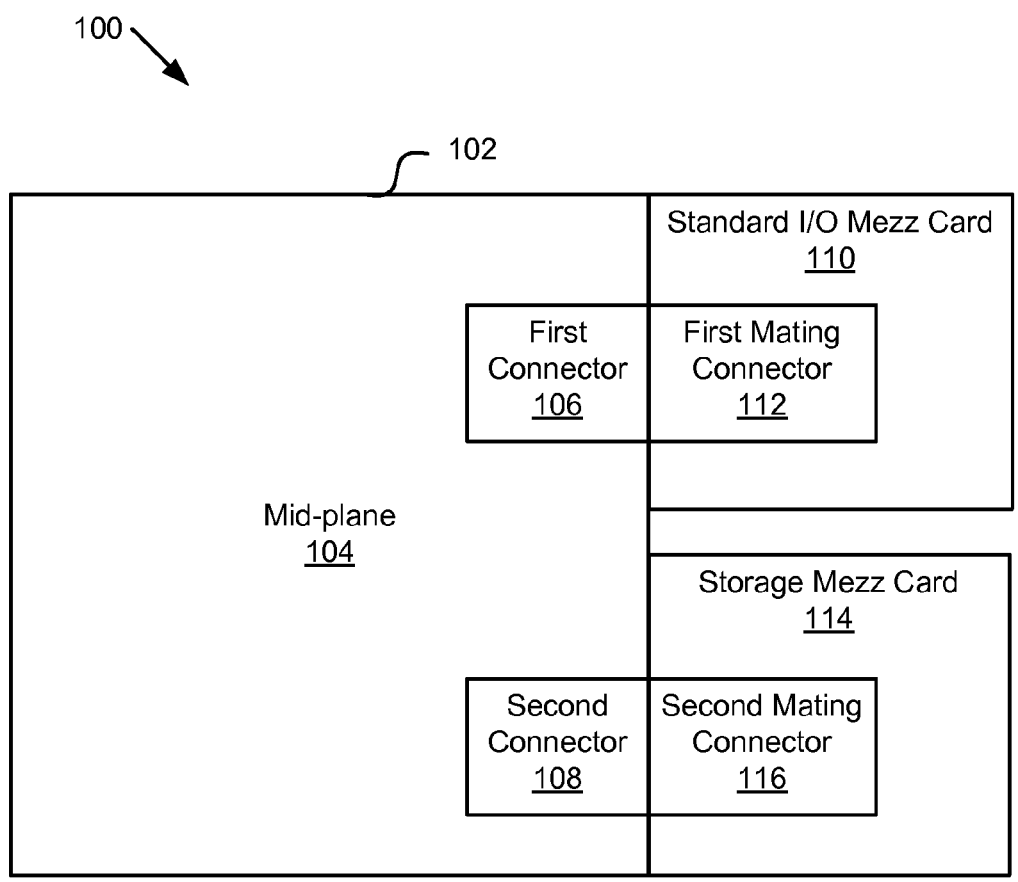
FIG. 1 is a schematic block diagram illustrating one embodiment of a system with a mid-plane connector configuration in accordance with one embodiment of the present invention.

FIG. 1 is a schematic block diagram illustrating one embodiment of a system 100 with a mid-plane connector configuration in accordance with one embodiment of the present invention. The system 100 includes an apparatus 102 that further includes a mid-plane 104 having a first connector 106 and a second connector 108. The system 100 also includes a standard input/output ("I/O") mezzanine ("mezz") card 110 having a first mating connector 112. The first connector 106 mates with (i.e., connects to) the first mating connector 112. As may be appreciated, the first connector 106 may be a plug or a receptacle (i.e., male or female). Furthermore, the first mating connector 112 may be a plug or a receptacle. However, as may be appreciated, if the first connector 106 is a plug, the first mating connector 112 is a receptacle, or vice versa.

The system 100 includes a storage mezz card 114 having a second mating connector 116. The second connector 108 mates with (i.e., connects to) the second mating connector 116. As may be appreciated, the second connector 108 may be a plug or a receptacle (i.e., male or female). Furthermore, the second mating connector 116 may be a plug or a receptacle. However, as may be appreciated, if the second connector 108 is a plug, the second mating connector 116 is a receptacle, or vice versa.

It should be noted that the system 100 includes only one embodiment of the first connector 106, the second connector 108, the first mating connector 112, and the second mating connector 116. In other embodiments, the first connector 106, the second connector 108, the first mating connector 112, and the second mating connector 116 may be any connectors in any type of system, such as typical cable connectors in an electrical system, a computer system, a computer, a laptop, a network system, and so forth.

In the illustrated embodiment, the mid-plane 104 may be a printed circuit board found in any suitable computer system, such as a server, a rack-mounted system, an expandable system, and so forth. In other embodiments, the first and second connectors 106, 108 are connected to something other than a mid-plane and a storage mezz card, which are depicted in FIG. 1. For example, the first and second connectors may be part of a motherboard, rack-mounted computer equipment, or other computer hardware in which a first connector 106 may be inserted into a first mating connector 112 but not a second mating connector 116, and a second connector 108 may be inserted in the first mating connector 112 as well as the second mating connector 116. In one embodiment, the mid-plane 104 may include a group of electrical connectors, such as the first and second connectors 106 and 108, in parallel with each other so that each pin of each connector is linked to the same relative pin of all the other connectors forming a computer bus. Moreover, in some embodiments, the mid-plane 104 may be used as a backbone to connect several printed circuit boards together to make a complete computer system. In certain embodiments, the mid-plane 104 may be constructed with slots for connecting to devices on both sides.

The first connector 106 may be a mezzanine connector or any other suitable type of connector. Moreover, in some embodiments, the first connector 106 may include a 3×8 housing size with a layout of 9 pins and 8 columns. Note that the pin configuration, in the embodiment, is a differential pair grouping with two signal pins and a ground pin associated with a differential pair. In one embodiment, the first connector 106 mates with the first mating connector 112 of the standard I/O mezz card 110, but is blocked from mating with the second mating connector 116 of the storage mezz card 114. In certain embodiments, the first connector 106 may include a guide pin and/or a guide socket to enable mating with the first mating connector 112 and to block mating with the second mating connector 116. Moreover, in some embodiments, the first connector 106 may include a guide block to facilitate mating with the first mating connector 112. In certain embodiments, the first connector 106 may be a male connector (e.g., plug) and may include conductive pins used to make electrical connections, while in other embodiments, the first connector 106 may be a female connector (e.g., receptacle) and may include conductive sockets used to make electrical connections.

The second connector 108 may be a mezzanine connector or any other suitable type of connector. Moreover, in some embodiments, the second connector 108 may include a 3×14 housing size with a layout of 9 pins and 14 columns. Again, in the embodiment the pin configuration is a differential pair grouping. In one embodiment, the second connector 108 mates with both the first mating connector 112 of the standard I/O mezz card 110 and the second mating connector 116 of the storage mezz card 114. In certain embodiments, the second connector 108 may include a guide pin and/or a guide socket to enable mating with the first and second mating connectors 112 and 116. Moreover, in some embodiments, the second connector 108 may include a guide block (not shown) to facilitate mating with the first and second mating connectors 112 and 116. In certain embodiments, the second connector 108 may be a male connector (e.g., plug) and may include conductive pins used to make electrical connections, while in other embodiments, the second connector 108 may be a female connector (e.g., receptacle) and may include conductive sockets used to make electrical connections.

The first mating connector 112 may be a mezzanine connector or any other suitable type of connector. Moreover, in some embodiments, the first mating connector 112 mates with either the first connector 106 or the second connector 108. In certain embodiments, the first mating connector 112 may include a guide pin and/or a guide socket to enable mating with the first and second connectors 106 and 108. Moreover, in some embodiments, the first mating connector 112 may include a guide block to facilitate mating with the first and second connectors 106 and 108. In certain embodiments, the first mating connector 112 may be a male connector (e.g., plug) and may include conductive pins used to make electrical connections, while in other embodiments, the first mating connector 112 may be a female connector (e.g., receptacle) and may include conductive sockets used to make electrical connections.

The second mating connector 116 may be a mezzanine connector or any other suitable type of connector. Moreover, in some embodiments, the second mating connector 116 mates with the second connector 108, but is blocked from mating with the first connector 106. In certain embodiments, the second mating connector 116 may include a guide pin and/or a guide socket to enable mating with the second connector 108, and to block mating with the first connector 106. Moreover, in some embodiments, the second mating connector 116 may include a guide block to facilitate mating with the second connector 108. In certain embodiments, the second mating connector 116 may be a male connector (e.g., plug) and may include conductive pins used to make electrical connections, while in other embodiments, the second mating connector 116 may be a female connector (e.g., receptacle) and may include conductive sockets used to make electrical connections.

While the apparatus 102 includes the mid-plane 104 having the first and second connectors 106 and 108 in the illustrated embodiment, in other embodiments, the apparatus 102 may include the first and second connectors 106 and 108 without including the mid-plane 104. Furthermore, while the system 100 includes the standard I/O mezz card 110 and the storage mezz card 114 having the first and second mating connectors 112 and 116, respectively, in other embodiments, the first and second mating connectors 112 and 116 may be part of any suitable device or devices. Indeed, the system 100 may be any suitable system including the first and second connectors 106 and 108 that mate to the first and second mating connectors 112 and 116.

As will be described in greater detail in FIGS. 2 and 3, one of the first connector and the first mating connector includes a first guide pin, and another of the first connector and the first mating connector includes a first guide socket. The first guide pin is insertable into the first guide socket and blocked from being inserted into a second guide socket. The second guide socket has a different shape than the first guide socket. One of the second connector and the second mating connector includes a second guide pin, and another of the second connector and the second mating connector includes the second guide socket. The second guide pin has a different shape than the first guide pin, and the second guide pin is insertable into the first and second guide sockets.

Figure 2:
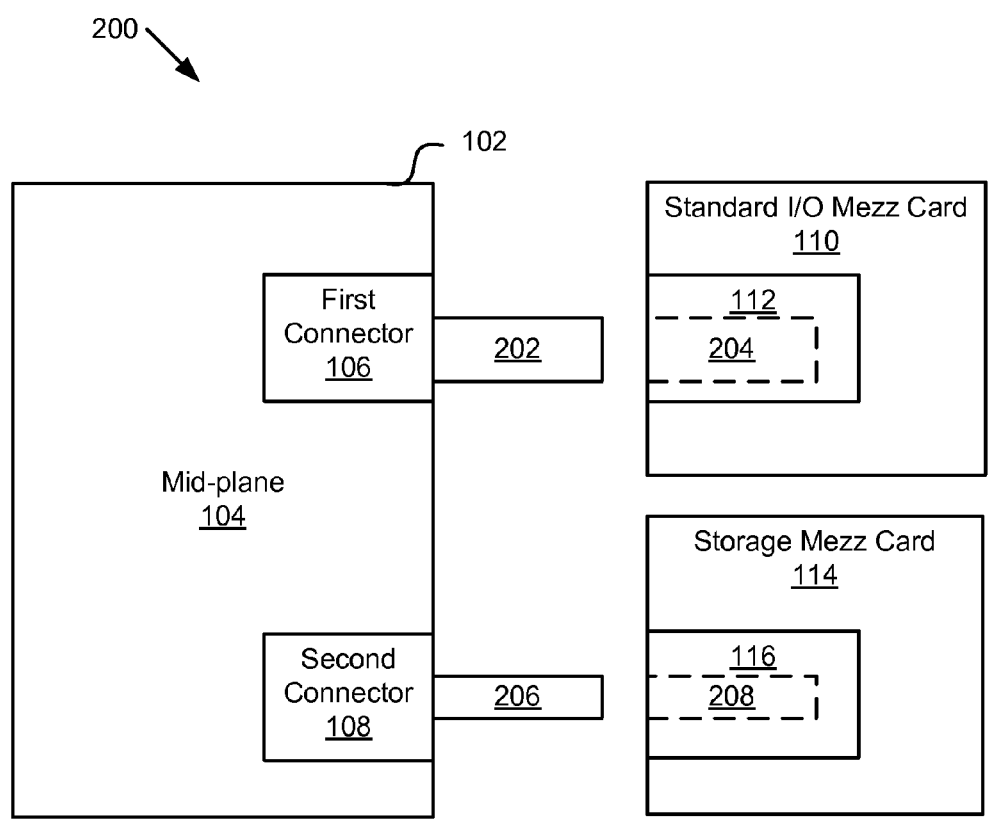
FIG. 2 is a schematic block diagram illustrating a second embodiment of a system with a mid-plane connector configuration in accordance with one embodiment of the present invention.

FIG. 2 is a schematic block diagram illustrating a second embodiment of a system 200 with a mid-plane connector configuration in accordance with one embodiment of the present invention. The system 200 includes one embodiment of the apparatus 102 having the mid-plane 104, the first connector 106, and the second connector 108, which are substantially similar to those described above in relation to the system 100 of FIG. 1. It should be noted that while the mid-plane 104 includes multiple types of connectors including the first and second connectors 106 and 108 in the illustrated embodiment, in other embodiments (not shown), the mid-plane 104 may include just the first connector 106, just the second connector 108, or other connectors.

The system 200 also includes one embodiment of the standard I/O mezz card 110 having the first mating connector 112, and the storage mezz card 114 having the second mating connector 116, which are substantially similar to those described above in relation to the system 100 of FIG. 1. The first connector 106 includes a first guide pin 202, the first mating connector 112 includes a first guide socket 204, the second connector 108 includes a second guide pin 206, and the second mating connector 116 includes a second guide socket 208, which are described below.

Although not shown for clarity, it should be noted that the first connector 106, the second connector 108, the first mating connector 112, and the second mating connector 116 each include either conductive pins or conductive sockets. Furthermore, the first guide pin 202, the first guide socket 204, the second guide pin 206 and the second guide socket 208 may be positioned at any location relative to the conductive pins or conductive sockets. For example, the first guide pin 202, the first guide socket 204, the second guide pin 206, and the second guide socket 208 may be positioned adjacent to, above, below, to the side of, to the left of, to the right of, and/or in the middle of the conductive pins or conductive sockets, and so forth.

Furthermore, and also not shown for clarity, the first connector 106, the second connector 108, the first mating connector 112, and the second mating connector 116 may each include a guide block that may include additional guide pins, guide sockets, and/or guide features to facilitate mating of the connectors.

The first guide pin 202 of the first connector 106 is insertable into the first guide socket 204 of the first mating connector 112 and blocked from being inserted into the second guide socket 208 of the second mating connector 116. In certain embodiments, an internal surface shape of the second guide socket 208 includes an internal shape of the first guide socket 204 plus an internal shape of an additional volume. As may be appreciated, the first guide socket 204 has a different shape than the second guide socket 208. Furthermore, it should be noted that the first guide pin 202 includes a guiding portion that guides connection of the first connector 106 with the first mating connector 112. Specifically, the first guide pin 202 guides (e.g., directs) connection between the first connector 106 and the first guide socket 204 of the first mating connector 112 so that the connector's respective pins and sockets align for proper electrical connection. This is further illustrated and described in relation to FIGS. 4A, 4B, 5A, 5B, 6A, and 6B, as found herein. Moreover, a shape of an outer surface of the first guide pin 202 substantially conforms to a shape of an inner surface of the first guide socket 204 so that the respective pins and sockets of the first connector 106 and the first mating connector 112 align and the pins move straight into the sockets.

The first guide socket 204 of the first mating connector 112 is shaped to receive and support insertion of both of the first guide pin 202 and the second guide pin 206. Moreover, a portion of the shape of the inner surface of the first guide socket 204 that conforms to the first guide pin 202 is shaped to maintain the second guide pin 206 in position as the second guide pin 206 is inserted into the first guide socket 204 substantially without movement in a direction perpendicular to the direction of insertion of the second guide pin 206.

The second guide pin 206 of the second connector 108 is insertable into the first guide socket 204 of the first mating connector 112 and insertable into the second guide socket 208 of the second mating connector 116. As may be appreciated, the first guide pin 202 has a different shape than the second guide pin 206. Furthermore, it should be noted that the second guide pin 206 includes a guiding portion that guides connection of the second connector 108 with either of the first mating connector 112 and the second mating connector 116. Specifically, the second guide pin 206 includes a guiding portion that guides (e.g., directs) connection between the second connector 108 and the first and second guide sockets 204 and 208 of the first and second mating connectors 112 and 116 so that the connector's respective pins and sockets align for proper electrical connection. This is further illustrated and described in relation to FIGS. 4B, 4C, 4D, 5B, 5C, 5D, 6B, 6C, and 6D, as found herein. Moreover, a shape of an outer surface of the second guide pin 206 includes a shape that is common with a portion of the first guide pin 202 and that conforms to a portion of the shape of the inner surface of the first guide socket 204 so that the respective pins and sockets of the second connector 108 and the first mating connector 112 align and the pins move straight into the sockets. In addition, the shape of the outer surface of the second guide pin 206 substantially conforms to a shape of an inner surface of the second guide socket 208 so that the respective pins and sockets of the second connector 108 and the second mating connector 116 align and the pins move straight into the sockets. The second guide socket 208 of the second mating connector 116 is shaped to receive and support insertion of the second guide pin 206, and blocks insertion of the first guide pin 202.

As may be appreciated, the first and second guide pins 202 and 206 and the first and second guide sockets 204 and 208 are used to enable and/or to block connection of various connectors (e.g., keying). However, in certain embodiments, the first guide pin 202, the first guide socket 204, the second guide pin 206, and/or the second guide socket 208 may be used as electrical conductors in addition to being used for keying.

In some embodiments, the first and second guide pins 202 and 206 and the first and second guide sockets 204 and 208 may be keyed as described, while in other embodiments, other guide pins and/or other guide sockets of the connectors may be a standard or uniform design, some connectors may include multiple keyed connectors, or some connectors may include multiple keyed guide pins and/or guide sockets. Furthermore, in certain embodiments, the first and second guide pins 202 and 206 may be the same size and/or the first and second guide sockets 204 and 208 may be the same size.

Figure 3:
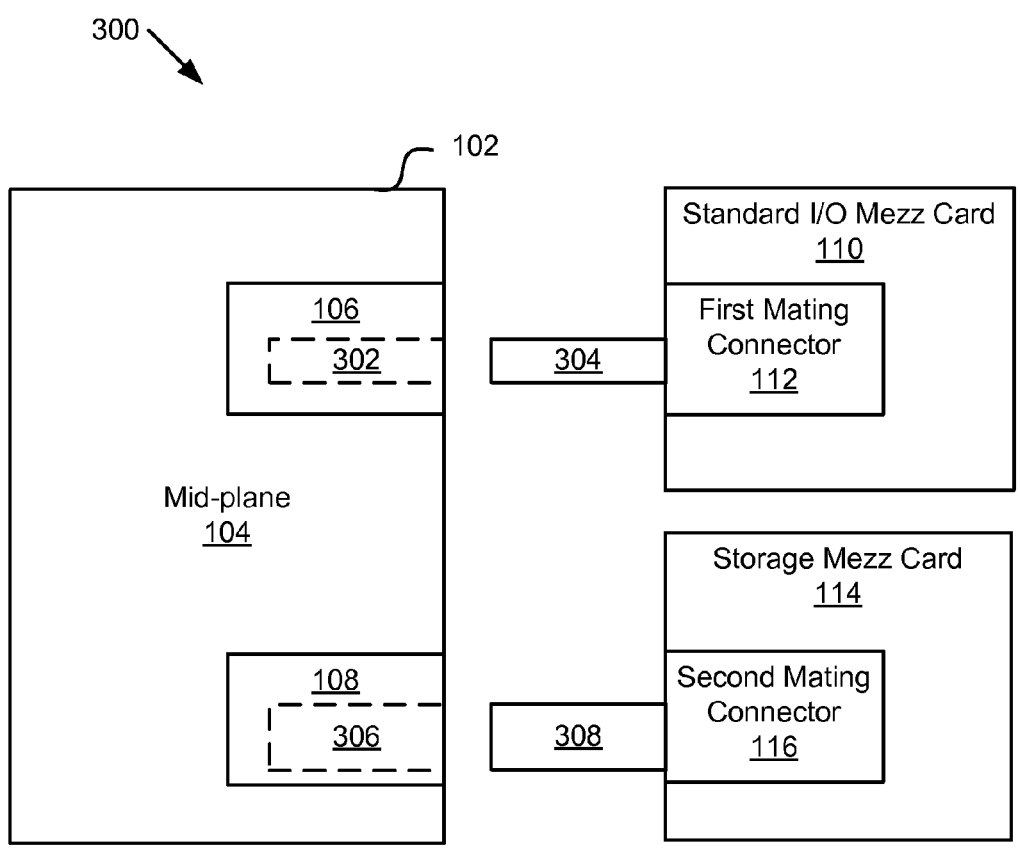
FIG. 3 is a schematic block diagram illustrating a third embodiment of a system with a mid-plane connector configuration in accordance with one embodiment of the present invention.

FIG. 3 is a schematic block diagram illustrating a third embodiment of a system 300 with a mid-plane connector configuration in accordance with one embodiment of the present invention. The system 300 includes one embodiment of the apparatus 102 having the mid-plane 104, the first connector 106, and the second connector 108, which are substantially similar to those described above in relation to the system 100 of FIG. 1. The system 300 also includes one embodiment of the standard I/O mezz card 110 having the first mating connector 112, and the storage mezz card 114 having the second mating connector 116, which are substantially similar to those described above in relation to the system 100 of FIG. 1. The first connector 106 includes a first guide socket 302, the first mating connector 112 includes a first guide pin 304, the second connector 108 includes a second guide socket 306, and the second mating connector 116 includes a second guide pin 308, which are described below.

The first guide pin 304 of the first mating connector 112 is insertable into the first guide socket 302 of the first connector 106 and insertable into the second guide socket 306 of the second connector 108. As may be appreciated, the first guide pin 304 has a different shape than the second guide pin 308. The first guide socket 302 of the first connector 106 is shaped to receive and support insertion of the first guide pin 304, and block insertion of the second guide pin 308.

The second guide pin 308 of the second mating connector 116 is insertable into the second guide socket 306 of the second connector 108 and blocked from being inserted into the first guide socket 302 of the first connector 106. As may be appreciated, the first guide socket 302 has a different shape than the second guide socket 306. The second guide socket 306 of the first connector 108 is shaped to receive and support insertion of both of the first guide pin 304 and the second guide pin 308.

FIG. 4A is a diagram illustrating one embodiment of a cross section of a first guide pin 400 in accordance with one embodiment of the present invention. The first guide pin 400 may be substantially similar to the first guide pin 202 described above in relation to the system 200 of FIG. 2 and/or the first guide pin 400 may be substantially similar to the second guide pin 308 described above in relation to the system 300 of FIG. 3. The first guide pin 400 includes a shape having an outer surface 402, a portion 404 with a common shape, and an external shape of an additional portion 406 (or additional volume), which are described below.

FIG. 4B is a diagram illustrating one embodiment of a cross section of a first guide socket 408 in accordance with one embodiment of the present invention. The first guide socket 408 may be substantially similar to the first guide socket 204 described above in relation to the system 200 of FIG. 2 and/or the first guide socket 408 may be substantially similar to the second guide socket 306 described above in relation to the system 300 of FIG. 3. The first guide socket 408 includes a shape having an inner surface 410, a portion 412 with a common shape, and an internal shape of an additional portion 414 (or additional volume), which are described below. FIG. 4B also illustrates a first direction 416 perpendicular to a second direction 418 that extends into the page, and a third direction 420 perpendicular to the first and second directions 416 and 418.

FIG. 4C is a diagram illustrating one embodiment of a cross section of a second guide pin 422 in accordance with one embodiment of the present invention. The second guide pin 422 may be substantially similar to the second guide pin 206 described above in relation to the system 200 of FIG. 2 and/or the second guide pin 422 may be substantially similar to the first guide pin 304 described above in relation to the system 300 of FIG. 3. The second guide pin 422 includes a shape having an outer surface 424 and a portion 426 with a common shape, which are described below.

FIG. 4D is a diagram illustrating one embodiment of a cross section of a second guide socket 428 in accordance with one embodiment of the present invention. The second guide socket 428 may be substantially similar to the second guide socket 208 described above in relation to the system 200 of FIG. 2 and/or the second guide socket 428 may be substantially similar to the first guide socket 302 described above in relation to the system 300 of FIG. 3. The second guide socket 428 includes a shape having an inner surface 430 and a portion 432 with a common shape, which are described below.

The first guide pin 400 and the first guide socket 408 each have a circular cross section in the illustrated embodiment; however, in other embodiments, the first guide pin 400 and the first guide socket 408 may have any suitably shaped cross section. In some embodiments, the circular cross section of the first guide pin 400 may be substantially constant along a length of the first guide pin 400. Furthermore, the circular cross section of the first guide socket 408 may be substantially constant along a length of the first guide socket 408. In one embodiment, the shapes of the cross sections of the first guide pin 400 and the first guide socket 408 match each other, while in other embodiments, the shapes of the cross sections of the first guide pin 400 and the first guide socket 408 do not match each other.

The second guide pin 422 and the second guide socket 428 each have a D-shaped cross section in the illustrated embodiment; however, in other embodiments, the second guide pin 422 and the second guide socket 428 may have any suitably shaped cross section. In some embodiments, the D-shaped cross section includes at least half of a circle, while in other embodiments, the D-shaped cross section includes greater than half of a circle. In one embodiment, the shapes of the cross sections of the second guide pin 422 and the second guide socket 428 match each other, while in other embodiments, the shapes of the cross sections of the second guide pin 422 and the second guide socket 428 do not match each other.

In some embodiments, a shape of the outer surface 402 of the first guide pin 400 substantially conforms to a shape of the inner surface 410 of the first guide socket 408. Furthermore, in certain embodiments, a shape of the outer surface 424 of the second guide pin 422 substantially conforms to a shape of the inner surface 430 of the second guide socket 428. Moreover, in one embodiment, the shape of the outer surface 424 of the second guide pin 422 includes a shape that is common with a portion of the first guide pin 400 and that conforms to the portion 412 of the shape of the inner surface 410 of the first guide socket 408.

In some embodiments, the portion 412 of the shape of the inner surface 410 of the first guide socket 408 is shaped to maintain the second guide pin 422 in position as the second guide pin 422 is inserted into the first guide socket 408 in the second direction 418. Specifically, the first guide socket 408 is shaped to maintain the second guide pin 422 in position as the second guide pin 422 is inserted into the first guide socket 408 substantially without movement in a direction perpendicular (e.g., the first direction 416, the third direction 420) to the direction of insertion of the second guide pin 422 (e.g., the second direction 418). Indeed, because the second guide pin 422 includes more than half of the circular shape of the first guide socket 408, the sides of the second guide pin 422 block the second guide pin 422 from moving downward. In other embodiments, such as an embodiment in which the second guide pin 422 is exactly half of the circular shape of the first guide socket, the guide block may facilitate guiding the pins into the sockets without lateral movement and/or downward movement.

In certain embodiments, the outer surface 424 of a cross section of the second guide pin 422 substantially conforms to a shape of a cross section of the inner surface 430 of the second guide socket 428 and the outer surfaces 402 and 424 of each of the first and second guide pins 400 and 422 share the portions 404 and 426. Furthermore, in some embodiments, the outer surface 402 of the cross section of the first guide pin 400 includes the additional portion 406 missing from the outer surface 424 of the cross section of the second guide pin 422.

In one embodiment, the inner surfaces 410 and 430 of a cross section of each of the first and second guide sockets 408 and 428 share the portions 412 and 432. Furthermore, in certain embodiments, the inner surface 410 of the cross section of the first guide socket 408 includes the additional portion 414 missing from the inner surface 430 of the cross section of the second guide socket 428.

In the illustrated embodiment, because the first guide pin 400 is round it will fit in the first guide socket 408, and because the second guide pin 422 includes the portion 426 that matches the round shape of the portion 412 of the first guide socket 408, the second guide pin 422 will also fit in the first guide socket 408. As may be appreciated, because the first guide pin 400 is fully round, it will not fit into the second guide socket 428 because of the missing additional portion 406 of the circle, but the second guide pin 422 will fit in the second guide socket 428 because the second guide pin 422 does not have the additional portion 406 of the circle.

It should be noted that the additional portions 406 and 414 of the circle shape that are missing from the second guide pin 422 and the second guide socket 428 may be on a side, a top, a bottom, etc. of the second guide pin 422 and the second guide socket 428. Moreover, positions of the additional portions 406 and 414 of the circle shape that are missing from the second guide pin 422 and the second guide socket 428 could be mixed and/or matched on multiple guide pins and guide socket to include many variations. For example, one connector type could have two guide sockets and the guide pins could have various shapes (i.e., one is round and the other is round with a portion missing on the bottom, one is round and the other could have one pin with a missing portion on the side, etc.). There are numerous possibilities when there are two or more guide pins and the shapes differ for the guide pins. The underlying commonality is that the guide pins work to guide the guide pins into the guide sockets without lateral movement while having the appropriate keying.

FIG. 5A is a diagram illustrating another embodiment of a cross section of a first guide pin 500 in accordance with one embodiment of the present invention. The first guide pin 500 may be substantially similar to the first guide pin 202 described above in relation to the system 200 of FIG. 2 and/or the first guide pin 500 may be substantially similar to the second guide pin 308 described above in relation to the system 300 of FIG. 3. The first guide pin 500 includes a shape having an outer surface 502, a portion 504 with a common shape, and an external shape of an additional portion 506 (or additional volume), which are described below.

FIG. 5B is a diagram illustrating another embodiment of a cross section of a first guide socket 508 in accordance with one embodiment of the present invention. The first guide socket 508 may be substantially similar to the first guide socket 204 described above in relation to the system 200 of FIG. 2 and/or the first guide socket 508 may be substantially similar to the second guide socket 306 described above in relation to the system 300 of FIG. 3. The first guide socket 508 includes a shape having an inner surface 510, a portion 512 with a common shape, and an internal shape of an additional portion 514 (or additional volume), which are described below. FIG. 5B also illustrates a first direction 516 perpendicular to a second direction 518 that extends into the page, and a third direction 520 perpendicular to the first and second directions 516 and 518.

FIG. 5C is a diagram illustrating another embodiment of a cross section of a second guide pin 522 in accordance with one embodiment of the present invention. The second guide pin 522 may be substantially similar to the second guide pin 206 described above in relation to the system 200 of FIG. 2 and/or the second guide pin 522 may be substantially similar to the first guide pin 304 described above in relation to the system 300 of FIG. 3. The second guide pin 522 includes a shape having an outer surface 524 and a portion 526 with a common shape, which are described below.

FIG. 5D is a diagram illustrating another embodiment of a cross section of a second guide socket 528 in accordance with one embodiment of the present invention. The second guide socket 528 may be substantially similar to the second guide socket 208 described above in relation to the system 200 of FIG. 2 and/or the second guide socket 528 may be substantially similar to the first guide socket 302 described above in relation to the system 300 of FIG. 3. The second guide socket 528 includes a shape having an inner surface 530 and a portion 532 with a common shape, which are described below.

In one embodiment, the shapes of the cross sections of the first guide pin 500 and the first guide socket 508 match each other, while in other embodiments, the shapes of the cross sections of the first guide pin 500 and the first guide socket 508 do not match each other. In addition, in one embodiment, the shapes of the cross sections of the second guide pin 522 and the second guide socket 528 match each other, while in other embodiments, the shapes of the cross sections of the second guide pin 522 and the second guide socket 528 do not match each other.

In some embodiments, a shape of the outer surface 502 of the first guide pin 500 substantially conforms to a shape of the inner surface 510 of the first guide socket 508. Furthermore, in certain embodiments, a shape of the outer surface 524 of the second guide pin 522 substantially conforms to a shape of the inner surface 530 of the second guide socket 528. Moreover, in one embodiment, the shape of the outer surface 524 of the second guide pin 522 includes a shape that is common with a portion of the first guide pin 500 and that conforms to the portion 512 of the shape of the inner surface 510 of the first guide socket 508.

In some embodiments, the portion 512 of the shape of the inner surface 510 of the first guide socket 508 is shaped to maintain the second guide pin 522 in position as the second guide pin 522 is inserted into the first guide socket 508 in the second direction 518. Specifically, the first guide socket 508 is shaped to maintain the second guide pin 522 in position as the second guide pin 522 is inserted into the first guide socket 508 substantially without movement in a direction perpendicular (e.g., the first direction 516, the third direction 520) to the direction of insertion of the second guide pin 522 (e.g., the second direction 518). Indeed, because the second guide pin 522 includes bottom portions around the protrusion of the first guide socket 508, the second guide pin 522 is blocked from moving downward or laterally within the first guide socket 508.

In certain embodiments, the outer surface 524 of a cross section of the second guide pin 522 substantially conforms to a shape of a cross section of the inner surface 530 of the second guide socket 528 and the outer surfaces 502 and 524 of each of the first and second guide pins 500 and 522 share the portions 504 and 526. Furthermore, in some embodiments, the outer surface 502 of the cross section of the first guide pin 500 includes the additional portion 506 missing from the outer surface 524 of the cross section of the second guide pin 522.

In one embodiment, the inner surfaces 510 and 530 of a cross section of each of the first and second guide sockets 508 and 528 share the portions 512 and 532. Furthermore, in certain embodiments, the inner surface 510 of the cross section of the first guide socket 508 includes the additional portion 514 missing from the inner surface 530 of the cross section of the second guide socket 528.

In the illustrated embodiment, because the first guide pin 500 is square with the additional portion 506 it will fit in the first guide socket 508, and because the second guide pin 522 includes the portion 526 that matches the square shape of the portion 512 of the first guide socket 508, the second guide pin 522 will also fit in the first guide socket 508. As may be appreciated, because the first guide pin 500 includes the additional portion 506 that extends beyond the square shape, it will not fit into the second guide socket 528 because of the missing additional portion 506, but the second guide pin 522 will fit in the second guide socket 528 because the second guide pin 522 does not have the additional portion 506 extending beyond the square shape.

In certain embodiments, the first guide pin 500 and the first guide socket 508 may have more than one of the additional portions 506 and 514. Moreover, the additional portions 506 and 514 may be any suitable shape, such as triangular, circular, and so forth. Furthermore, the additional portions 506 and 514 may be positioned on a side, a top, a bottom, etc. of the first guide pin 506 and the first guide socket 508.

Figure 6A:
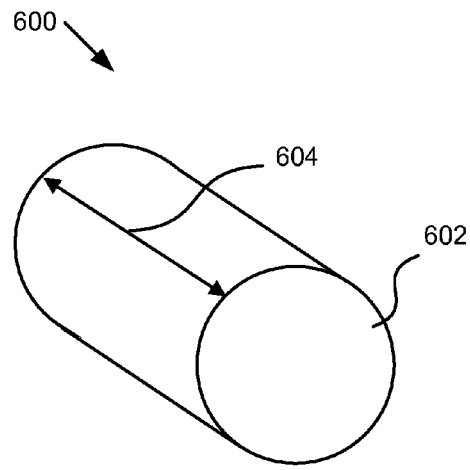
FIG. 6A is a perspective view of one embodiment of a first guide pin in accordance with one embodiment of the present invention.

FIG. 6A is a perspective view of one embodiment of a first guide pin 600 in accordance with one embodiment of the present invention. The first guide pin 600 may be substantially similar to the first guide pin 202 described above in relation to the system 200 of FIG. 2 and/or the first guide pin 600 may be substantially similar to the second guide pin 308 described above in relation to the system 300 of FIG. 3. The first guide pin 600 has a cross section having a circular shape 602 that is uniform (i.e., substantially constant) along an entire body length 604 of the first guide pin 600.

Figure 6B:
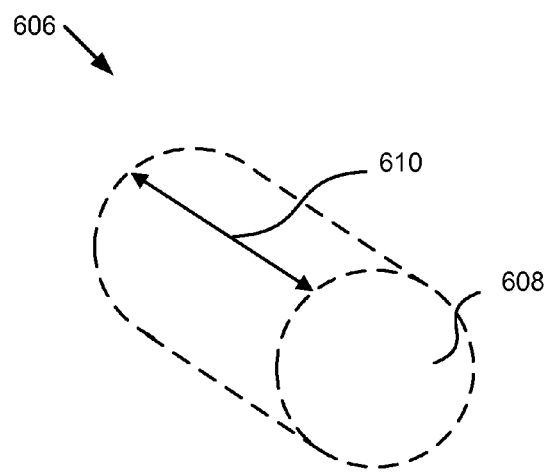
FIG. 6B is a perspective view of one embodiment of a first guide socket in accordance with one embodiment of the present invention.

FIG. 6B is a perspective view of one embodiment of a first guide socket 606 in accordance with one embodiment of the present invention. The first guide socket 606 may be substantially similar to the first guide socket 204 described above in relation to the system 200 of FIG. 2 and/or the first guide socket 606 may be substantially similar to the second guide socket 306 described above in relation to the system 300 of FIG. 3. The first guide socket 606 has a cross section having a circular shape 608 that is uniform along an entire body length 610 of the first guide socket 606.

Figure 6C:
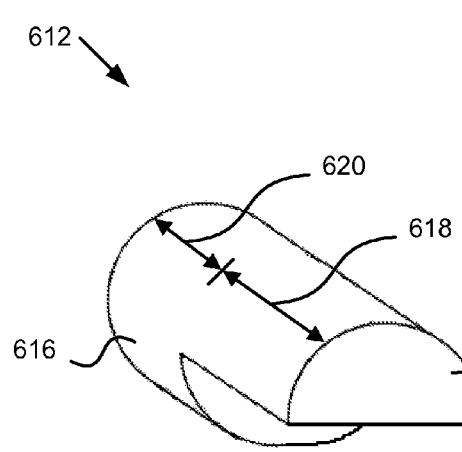
FIG. 6C is a perspective view of one embodiment of a second guide pin in accordance with one embodiment of the present invention.

FIG. 6C is a perspective view of one embodiment of a second guide pin 612 in accordance with one embodiment of the present invention. The second guide pin 612 may be substantially similar to the second guide pin 206 described above in relation to the system 200 of FIG. 2 and/or the second guide pin 612 may be substantially similar to the first guide pin 304 described above in relation to the system 300 of FIG. 3. The second guide pin 612 is stepped to include a first end 614 having a D-shaped cross section and a second end 616 having a circular cross section. Although the first end 614 has a D-shaped cross section and the second end 616 has a circular cross section, other embodiments may have different shapes for the first and second ends 614 and 616. The D-shaped cross section extends through a first section 618 of the second guide pin 612 and the circular cross section extends through a second section 620 of the second guide pin 612.

Figure 6D:
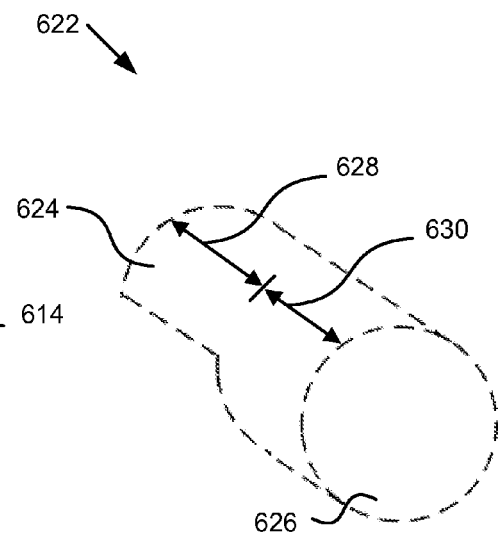
FIG. 6D is a perspective view of one embodiment of a second guide socket in accordance with one embodiment of the present invention.

FIG. 6D is a perspective view of one embodiment of a second guide socket 622 in accordance with one embodiment of the present invention. The second guide socket 622 may be substantially similar to the second guide socket 208 described above in relation to the system 200 of FIG. 2 and/or the second guide socket 622 may be substantially similar to the first guide socket 302 described above in relation to the system 300 of FIG. 3. The second guide socket 622 is stepped to include a first end 624 having a D-shaped cross section and a second end 626 having a circular cross section. The D-shaped cross section of the first end 624 may include at least half of a circle in some embodiments, while in other embodiments, the D-shaped cross section of the first end 624 may include greater than half of a circle. Although the first end 624 has a D-shaped cross section and the second end 626 has a circular cross section, other embodiments may have different shapes for the first and second ends 624 and 626. The D-shaped cross section extends through a first section 628 of the second guide socket 622 and the circular cross section extends through a second section 630 of the second guide socket 622. In certain embodiments, the second guide pin 612 and the second guide socket 622 may be stepped differently than illustrated. For example, the missing portion from the cylindrical shape may be positioned on a side, a top, a bottom, etc. of the second guide pin 612 and the second guide socket 622. In addition, the missing portion from the cylindrical shape may be a larger portion of the circular cross section, or a smaller portion of the circular cross section. Moreover, the length of the first and second sections 618, 628, 620, and 630 may be larger or smaller. In some embodiments, the length of the first and second sections 618, 628, 620, and 630 may be selected so that the step between the two different shapes is positioned to block connector pins and/or sockets from contacting one another if the first guide pin 600 is inserted into the second guide socket 622.

The first guide pin 600 and the first guide socket 606 each have a circular cross section in the illustrated embodiment; however, in other embodiments, the first guide pin 600 and the first guide socket 606 may have any suitably shaped cross section. For example, the first guide pin 600 and the first guide socket 606 may be a square cross section with an additional portion extending therefrom, a triangular cross section with an additional portion extending therefrom, and so forth. In one embodiment, the shapes of the cross sections of the first guide pin 600 and the first guide socket 606 match each other, while in other embodiments, the shapes of the cross sections of the first guide pin 600 and the first guide socket 606 do not match each other.

A cross section of the first end 614 of the second guide pin 612 includes only a portion of a cross section of the second end 616 of the second guide pin 612. In certain embodiments, a cross section of the second end 616 of the second guide pin 612 substantially matches a cross section of the first guide pin 600. To couple the second guide pin 612 to the second guide socket 622, the first end 614 of the second guide pin 612 is first inserted into the second end 626 of the second guide socket 622. Accordingly, the shape of the second guide socket 622 is inverted as compared to the second guide pin 612. In one embodiment, the shapes of the cross sections of the second guide pin 612 and the second guide socket 622 match each other if the second guide socket 622 is inverted as compared to the second guide pin 612, while in other embodiments, the shapes of the cross sections of the second guide pin 612 and the second guide socket 622 do not match each other if the second guide socket 622 is inverted.

In some embodiments, a shape of an outer surface of the first guide pin 600 substantially conforms to a shape of an inner surface of the first guide socket 606. Furthermore, in certain embodiments, a shape of an outer surface of the second guide pin 612 substantially conforms to a shape of an inner surface of the second guide socket 622. Moreover, in one embodiment, the shape of the outer surface of the second guide pin 612 also substantially conforms to a portion of the shape of the inner surface of the first guide socket 606.

In some embodiments, the portion of the shape of the inner surface of the first guide socket 606 is shaped to maintain the second guide pin 612 in position as the second guide pin 612 is inserted into the first guide socket 606 substantially without movement in a direction perpendicular to the direction of insertion of the second guide pin 612.

In the illustrated embodiment, because the first guide pin 600 is cylindrical it will fit in the first guide socket 606, and because the second guide pin 612 includes a portion that matches the cylindrical shape of the first guide socket 606, the second guide pin 612 will also fit in the first guide socket 606. As may be appreciated, because the first guide pin 600 includes an additional portion that is missing from the stepped second guide socket 622, it will not fit into the second guide socket 622, but the second guide pin 612 will fit in the second guide socket 622 because the second guide pin 612 is stepped to match the stepped shape of the second guide socket 622.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first connector comprising a first guide pin insertable into a first guide socket of a first mating connector and blocked from being inserted into a second guide socket of a second mating connector, wherein the second guide socket comprises a different shape than the first guide socket; and
   a second connector comprising a second guide pin having a different shape than the first guide pin, wherein the second guide pin is insertable into the first guide socket of the first mating connector and insertable into the second guide socket of the second mating connector, wherein a shape of an outer surface of the first guide pin substantially conforms to a shape of an inner surface of the first guide socket, and a shape of an outer surface of the second guide pin comprises a shape that is common with a portion of the first guide pin and that conforms to a portion of the shape of the inner surface of the first guide socket and wherein the portion of the shape of the inner surface of the first guide socket that conforms to the first guide pin is shaped to maintain the second guide pin in position as the second guide pin is inserted into the first guide socket substantially without movement in a direction perpendicular to the direction of insertion of the second guide pin.

2. The apparatus of claim 1, wherein an internal surface shape of the first guide socket comprises an internal shape of the second guide socket plus an internal shape of an additional volume.

3. The apparatus of claim 1, wherein the first guide pin comprises a guiding portion that guides connection of the first connector with the first mating connector and the second guide pin comprises a guiding portion that guides connection of the second connector with either of the first mating connector and the second mating connector.

4. The apparatus of claim 1, wherein an outer surface of a cross section of the second guide pin substantially conforms to a shape of a cross section of an inner surface of the second guide socket and an outer surface of a cross section of each of the first and second guide pins share a portion with a common shape and the outer surface of the cross section of the first guide pin includes an additional portion missing from the outer surface of the cross section of the second guide pin.

5. The apparatus of claim 1, wherein an inner surface of a cross section of each of the first and second guide sockets share a portion with a common shape and the inner surface of the cross section of the first guide socket includes an additional portion missing from the inner surface of the cross section of the second guide socket.

6. The apparatus of claim 1, wherein the second guide pin is stepped to include a first section having a first shape and a second section having second shape, wherein a cross section of the first shape comprises only a portion of a cross section of the second shape, wherein the first section is disposed on an end of the second guide pin first inserted into a guide socket.

7. The apparatus of claim 6, wherein a cross section of the first guide pin substantially matches the cross section of the second shape, and the cross section of the first guide pin is uniform along a body length of the first guide pin.

8. The apparatus of claim 6, wherein the second guide socket is stepped to match the first and second sections of the second guide pin.

9. The apparatus of claim 1, wherein the first guide pin comprises a circular cross section.

10. The apparatus of claim 9, wherein the circular cross section is substantially constant along a length of the first guide pin.

11. The apparatus of claim 1, wherein the second guide pin comprises a D-shaped cross section.

12. The apparatus of claim 11, wherein the D-shaped cross section comprises at least half of a circle.

13. The apparatus of claim 11, wherein the D-shaped cross section comprises greater than half of a circle.

14. The apparatus of claim 1, comprising a mid-plane including the first and second connectors.

15. The apparatus of claim 1, wherein the first and second connectors are mezzanine connectors.

16. An apparatus comprising:
   a first connector comprising a first guide socket that receives a first guide pin of a first mating connector and blocks a second guide pin of a second mating connector, wherein the second guide pin comprises a different shape than the first guide pin; and
   a second connector comprising a second guide socket having a different shape than the first guide socket, wherein the second guide socket is able to receive the first guide pin of the first mating connector and the second guide pin of the second mating connector, wherein a shape of an outer surface of the first guide pin substantially conforms to a shape of an inner surface of the first guide socket, and a shape of an outer surface of the second guide pin comprises a shape that is common with a portion of the first guide pin and that conforms to a portion of the shape of the inner surface of the first guide socket and wherein the portion of the shape of the inner surface of the first guide socket that conforms to the first guide pin is shaped to maintain the second guide pin in position as the second guide pin is inserted into the first guide socket substantially without movement in a direction perpendicular to the direction of insertion of the second guide pin.

17. A system comprising:

a first connector;

a first mating connector, wherein one of the first connector and the first mating connector comprises a first guide pin, and another of the first connector and the first mating connector comprises a first guide socket, the first guide pin is insertable into the first guide socket and blocked from being inserted into a second guide socket, and the second guide socket comprises a different shape than the first guide socket;

a second connector; and a second mating connector, wherein one of the second connector and the second mating connector comprises a second guide pin, and another of the second connector and the second mating connector comprises the second guide socket, the second guide pin has a different shape than the first guide pin, the second guide pin is insertable into the first and second guide sockets wherein a shape of an outer surface of the first guide pin substantially conforms to a shape of an inner surface of the first guide socket, and a shape of an outer surface of the second guide pin comprises a shape that is common with a portion of the first guide pin and that conforms to a portion of the shape of the inner surface of the first guide socket and wherein the portion of the shape of the inner surface of the first guide socket that conforms to the first guide pin is shaped to maintain the second guide pin in position as the second guide pin is inserted into the first guide socket substantially without movement in a direction perpendicular to the direction of insertion of the second guide pin.

18. The system of claim 17, wherein the first connector is a connector of a standard input/output ("I/O") mezzanine card and the second connector is a connector of a storage mezzanine card.

* * * * *